United States Patent [19]

Andres et al.

[11] 4,028,905
[45] June 14, 1977

[54] PRNI$_5$ AS A CRYOGENIC REFRIGERANT

[75] Inventors: Klaus Andres, Berkeley Heights; Paul Herman Schmidt, Chatham, both of N.J.

[73] Assignee: Bell Telephone Laboratories, Incorporated, Murray Hill, N.J.

[22] Filed: Oct. 20, 1975

[21] Appl. No.: 623,808

[52] U.S. Cl. .................................... 62/3; 252/462
[51] Int. Cl.$^2$ ................... F25B 21/02; B01J 23/10
[58] Field of Search .................. 62/3; 252/70, 462; 156/603, 622, 624; 29/180 CJ, 180 E

[56] References Cited

UNITED STATES PATENTS

| | | | |
|---|---|---|---|
| 3,004,394 | 10/1961 | Fulton, Jr. et al. | 62/3 |
| 3,119,236 | 1/1964 | Lutes | 62/3 |
| 3,125,861 | 3/1964 | Jaep | 62/3 |
| 3,393,526 | 7/1968 | Pearl | 62/3 |
| 3,638,440 | 2/1972 | Lawless | 62/3 |
| 3,714,539 | 1/1973 | Hampl, Jr. | 62/3 |
| 3,774,404 | 11/1973 | Walker et al. | 62/3 |
| 3,800,256 | 3/1974 | Garwin | 62/3 |
| 3,841,107 | 10/1974 | Clark | 62/3 |
| 3,884,726 | 5/1975 | Landecker | 62/3 |

*Primary Examiner*—Lloyd L. King
*Attorney, Agent, or Firm*—Allen N. Friedman

[57] ABSTRACT

As a cryogenic refrigerant in an adiabatic demagnetization refrigerator, the intermetallic compound PrNi$_5$ has been used to reach the millidegree Kelvin temperature range. The compound has a relatively large cooling entropy in this range and the specific heat peak, characteristic of materials of this class, occurs well below one millidegree. The material is easily solderable and is incorporated into a "cooling pill" by soldering to the metal wires or foils needed for producing thermal contact to the material to be refrigerated. The use of oriented crystals with their hexagonal axes perpendicular to the applied magnetic field is particularly advantageous. Suitable single phase PrNi$_5$ bodies have been produced by annealing bulk melted samples, by Czochralski growth and by an extrusion method.

9 Claims, 5 Drawing Figures

PRNi₅ AS A CRYOGENIC REFRIGERANT

BACKGROUND OF THE INVENTION

1. Field of the Invention

The invention is in the field of cryogenic refrigeration by the method of adiabatic demagnetization.

2. Description of the Prior Art

A widely used technique in cryogenic refrigeration (i.e., refrigeration near the absolute zero of temperature) is the adiabatic demagnetization of a paramagnetic material. One of the earliest materials used for this purpose is the paramagnetic salt, cerium magnesium nitrate. However, at extremely low temperatures, (e.g., less than 0.01° K) the thermal conductivity of this salt is so low that it is difficult to produce secondary cooling of the material which it is desired to refrigerate. More recently, in order to overcome this problem through the use of metallic conductivity, intermetallic rare earth compounds exhibiting paramagnetism of the Van Vleck type, have been used. The operation of these materials as refrigerants involves the nuclear magnetic entropy and the fact that magnetic fields at the nuclei of Van Vleck paramagnetic ions are much enhanced over the external applied field. In particular, one set of such intermetallic compounds, reaching temperatures between 1.5 and 5 millidegrees Kelvin, are the praseodymium compounds $PrTl_3$, $PrPt_5$ and $PrCu_6$ (*Physical Review Letters*, 24 (1970) 1181, *Physical Review*, B10 (1974) 1967 and *Journal of Low Temperature Physics*, 9 (1972) 267). Interest in the millidegree and submillidegree Kelvin range has been recently sparked by the discovery of unexpected properties of liquid $He^3$ in this temperature range.

SUMMARY OF THE INVENTION

It has been found that $PrNi_5$ is capable of producing refrigeration to lower temperatures than other known materials of the same class by the process of adiabatic demagnetization. This material is convenient to use, in that it is relatively chemically stable in air and easily solderable to the metal wires or foils incorporated in the "cooling pill" needed for an adiabatic demagnetization refrigerator. This material has been used to produce temperatures in the millidegree Kelvin range. It has a relatively large cooling entropy and, since the specific heat peak is well below one millidegree Kelvin, it shows promise of utility as a refrigerant to temperatures below one millidegree. The use of oriented crystals with their hexagonal axes perpendicular to the applied magnetic field has been shown to be particularly advantageous. Suitable single phase $PrNi_5$ bodies have been produced by annealing bulk melted samples, by Czochralski growth and by an extrusion method.

DETAILED DESCRIPTION

Adiabatic Demagnetization Refrigeration Using $PrNi_5$

Rare earth intermetallic compounds exhibiting paramagnetism of the Van Vleck type are useful for adiabatic demagnetization refrigeration, since large local magnetic fields can be induced at the rare earth nucleus with moderate applied magnetic fields. It has been found that $PrNi_5$ is the most favorable material of this class yet known, for refrigeration in the millidegree Kelvin temperature range (i.e., refrigeration to temperatures of the order of one thousandth of a degree above the absolute zero of temperature). Several properties of this material combine to make it particularly useful for such cryogenic refrigeration. It possesses a relatively large cooling entropy. It is relatively chemically stable in air. Its metallic thermal conductivity facilitates indirect cooling of other materials. This is also facilitated by the fact that $PrNi_5$ is easily solderable to metal wires or foils to produce a convenient "cooling pill". In addition, the specific heat peak in zero magnetic field, which is characteristic of this class of materials, occurs well below 1 millidegree.

Figure 1:
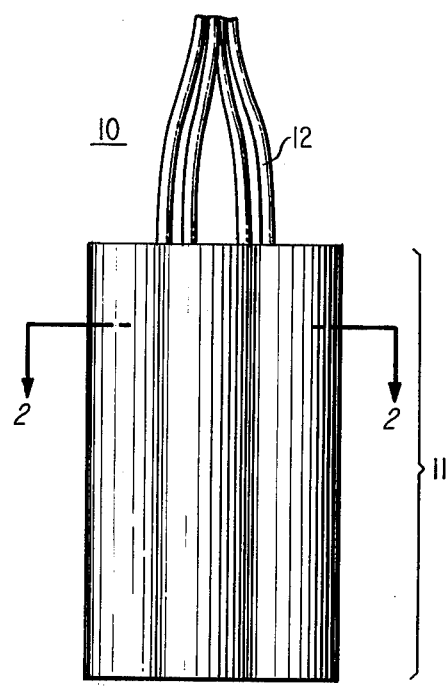
FIG. 1 is an elevational view of an exemplary "cooling pill"
Figure 2:
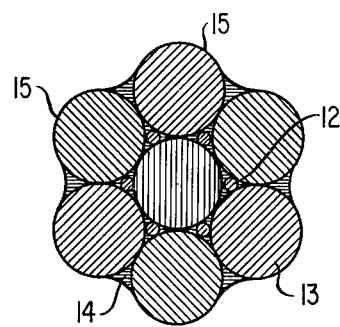
FIG. 2 is a cross sectional view of the device of FIG. 1.

FIG. 1 shows an exemplary cooling pill 10 consisting of group 11 of soldered $PrNi_5$ rods, from which is protruding, a group of copper wires 12. This is shown in cross section in FIG. 2. This FIG. shows in detail the manner in which the cooling pill 10 is comprised of $PrNi_5$ rods 13, copper wires 12 and interstitial solder 14, which holds the pill 10 in a mechanically and thermally compact unit. The use of copper is merely exemplary and many other materials, known in the art for their thermally conductive and advantageous mechanical properties, may be used. The solder 14 may be applied, for example, by immersing the bundled rods and wires into a bath of molten metal, such as tin, indium or cadmium. The multi-element cooling pill of FIGS. 1 and 2 is also merely exemplary and as few as one $PrNi_5$ body metallically bonded to one thermally conductive metal wire may be used.

Figure 3:
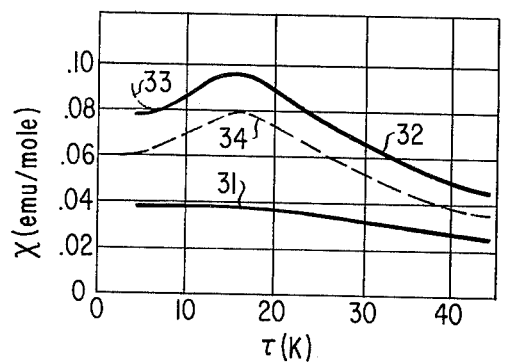
FIG. 3 is a set of curves showing the magnetic susceptibility (ordinate) of $PrNi_5$ as a function of temperature (abscissa)

$PrNi_5$ crystalizes in the hexagonal $CaCu_5$ structure. This intermetallic compound, in this crystal phase, exhibits no long range magnetic ordering, and the nuclear paramagnetism of the Van Vleck type is the dominant magnetic property at the low temperatures of interest. The use of crystalline bodies of as nearly single phase as possible is necessary, since other phases exhibit long range magnetic order which is detrimental to the desired refrigeration effect. This detriment is due, at least in part, to increased heat capacity and hysteresis loss as the magnetic field is reduced for refrigeration. FIG. 3 is a set of curves showing the magnetic susceptibility of single crystals of $PrNi_5$ as a function of temperature. These curves shown that the magnetic susceptibility of $PrNi_5$ is anisotropic, being larger perpendicular to the hexagonal axis 34 than it is parallel to the hexagonal axis 31. The magnetic susceptibility of polycrystalline material would be the weighted average of these two curves and would follow a curve between them such as the dashed curve 34. Thus, it is advantageous for adiabatic demagnetization with this material to use crystalline bodies which are oriented with the hexagonal crystal axis normal to the applied magnetic field. The increased susceptibility thus achieved produces greater cooling power.

Figure 5:
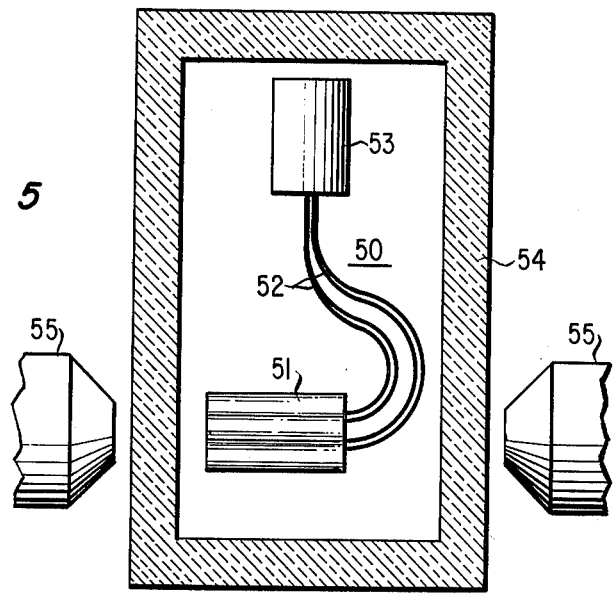
FIG. 5 is a schematic view of an exemplary adiabatic demagnetization refrigerator.

FIG. 5 shows, in schematic form, the essential elements of an adiabatic demagnetization refrigerator.

The refrigerant 51 and thermally conducting wires 52, forming the cooling pill 50, are thermally connected to the subject body of material 53 which it is desired to cool. The other elements which are necessary to produce adiabatic demagnetization refrigeration are schematically represented in FIG. 5 as a thermal shield 54. Such devices and means are well known in the art to include such things as vacuum shields and $He^3 - He^4$ dilution refrigerators.

In order to produce adiabatic demagnetization refrigeration, the temperature of the cooling pill 50 and the subject body 53 are reduced by such other means 54 to a starting temperature of the order of 50 millidegrees Kelvin, in a magnetic field produced by some means schematically represented by the magnet pole pieces 55. The thermal link between these elements 50, 53 and the external refrigerators 54 is then broken and the magnetic field slowly reduced to some low value. This field reduction reduces the temperature of the refrigerant body 51 and thermal energy is extracted from the subject body 53 by means of the thermally conducting elements 52, thus producing refrigeration of the subject body 53.

Production of $PrNi_5$

The bodies of $PrNi_5$ suitable for use as an adiabatic demagnetization refrigerant have been produced by several methods. These methods have started by the melting of stoichiometric amounts of constituent elements (Pr and Ni) in an inert atmosphere, for example, in an arc furnace. The melting temperature of the compound is approximately 1450° C. If the molten mass is allowed to solidify in the furnace hearth a polycrystalline body is produced. Such bodies have not been found to be suitable for use, as thus formed, because they have been found to consist of more than the desired one crystal phase. The polyphase nature of such bodies is evidenced by a marked increase in magnetic susceptibility at temperatures of the order of 4.2 degrees Kelvin, such as is indicated in FIG. 3 by the dashed line 33. However, it has been found that the annealing of such polycrystalline bodies at temperatures of the order of 1000-1100° C for some extended time, for example, two days, in inert atmosphere (e.g., argon) or, preferably, in vacuum, produces a body which is sufficiently single phase.

Figure 4:
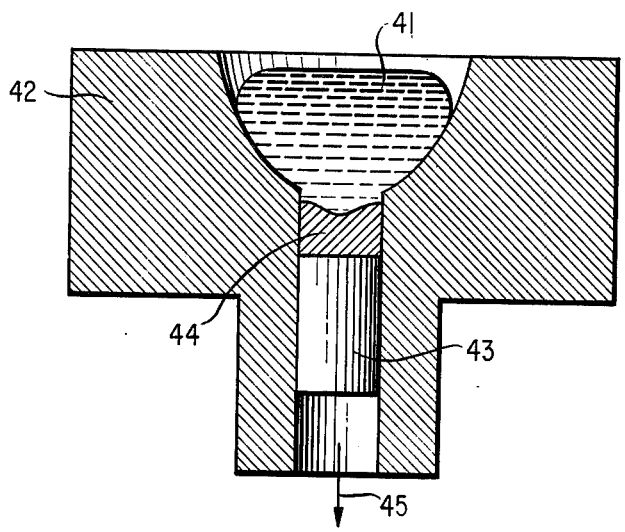
FIG. 4 is an elevational view in section of a portion of an exemplary arc melting apparatus.

Single crystals of $PrNi_5$ have also been produced by Czochralski growth from an arc melted liquid. Such crystals tend to grow with the hexagonal axis parallel to the direction of crystal growth. Crystals thus grown have shown no discernible evidence of the presence of a second phase. Suitable rods have also been grown by an extrusion process, such as is illustrated in FIG. 4. In this process, the hearth 42 of the arc melter was drilled out at the bottom and provided with a slidable plug 43. After formation of the melt 41 the plug 43 was slowly withdrawn in the direction of the arrow 45 and a crystalline body 44 was directionally solidified from the melt 41. Bodies thus produced have been polycrystalline but sufficiently single phase for use. In fact, these rods exhibited indications of preferential crystal growth with the hexagonal axes radially oriented. Thus, these rods were particularly suitable for use with an axial applied field, as illustrated in FIG. 5.

$PrNi_5$ Refrigerator

A cooling pill, such as illustrated in FIGS. 1 and 2, was made of pieces of extruded $PrNi_5$ rods approximately 6 millimeters in diameter, which were assembled into seven rods 13 with a total length of 6 centimeters each. In the interstices of the $PrNi_5$ rods 13, were placed six copper wires 12 approximately 1 millimeter in diameter extending beyond rods 13. The bundled rods and wires were dipped into a bath of molten copper saturated cadmium filling the interstices and mechanically and thermally bonding together the pill 10. Cadmium was used because its relatively low superconducting critical field (i.e., < 100 Oe) permits demagnetization to a lower field. The pill 10 was filed at the outer edge 15 of each rod 13 along the entire length of each rod to prevent the occurrence of a highly electrically conducting path around the circumference of the pill. The existence of such a path would produce undesirable eddy current losses as the magnetic field is reduced. The cooling pill thus produced was incorporated in an adiabatic demagnetization refrigerator, as described above, incorporating a $AuIn_2$ nuclear susceptibility thermometer. Adiabatic demagnetization from 25 millidegrees K and 20,000 Oersteds of magnetic field to 100 Oersteds in approximately one hour, produced refrigeration to 1.3 millidegrees K.

What is claimed is:

1. A cryogenic cooling sill comprising at least one first body of a refrigerant material, bonded by means of a metallic bonding agent to at least one second body of thermal conductor material extending beyond the first body CHARACTERIZED IN THAT the refrigerant material consists essentially of $PrNi_5$.

2. A device of claim 1 in which the thermal conductor material is copper.

3. A device of claim 1 in which the bonding agent is copper saturated cadmium.

4. A device of claim 1 in which the at least one first body includes a plurality of rods of the refrigerant material.

5. A device of claim 1 in which the at least one first body consists essentially of a single crystal of the refrigerant material with the hexagonal crystal direction parallel to the long axis of the first body.

6. A device of claim 1 in which the at least one second body includes a plurality of cylindrical members.

7. A cryogenic refrigerator comprising a thermally insulating container, means for producing a variable magnetic field at a position within the container, and a cooling pill CHARACTERIZED IN THAT the cooling pill consists essentially of a device comprising at least one first body of a refrigerant material, bonded by means of a metallic bonding agent to at least one second body of thermal conductor material extending beyond the first body, wherein the refrigerant material consists essentially of $PrNi_5$.

8. A device of claim 7 in which the at least one first body includes a plurality of rods of the refrigerant material.

9. A device of claim 7 in which the at least one first body consists essentially of a single crystal of the refrigerant material with the hexagonal crystal direction parallel to the long axis of the first body.

* * * * *